(12) United States Patent
Chae et al.

(10) Patent No.: US 10,555,309 B2
(45) Date of Patent: Feb. 4, 2020

(54) METHOD AND DEVICE FOR TRANSMITTING DOWNLINK SIGNAL IN WIRELESS COMMUNICATION SYSTEM

(71) Applicant: LG ELECTRONICS INC., Seoul (KR)

(72) Inventors: Hyukjin Chae, Seoul (KR); Youngtae Kim, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,221

(22) PCT Filed: Jul. 17, 2015

(86) PCT No.: PCT/KR2015/007458
§ 371 (c)(1),
(2) Date: Jan. 13, 2017

(87) PCT Pub. No.: WO2016/010399
PCT Pub. Date: Jan. 21, 2016

(65) Prior Publication Data
US 2017/0214442 A1    Jul. 27, 2017

Related U.S. Application Data

(60) Provisional application No. 62/026,011, filed on Jul. 17, 2014.

(51) Int. Cl.
*H04W 72/04* (2009.01)
*H04B 7/0456* (2017.01)
(Continued)

(52) U.S. Cl.
CPC ........ *H04W 72/048* (2013.01); *H04B 7/0456* (2013.01); *H04L 5/0048* (2013.01); *H04W 72/0446* (2013.01)

(58) Field of Classification Search
CPC ... H04B 7/0456; H04B 7/0413; H04L 5/0048; H04L 5/0091; H04L 5/0051; H04L 5/0007; H04W 72/048; H04W 72/0446
See application file for complete search history.

(56) References Cited

U.S. PATENT DOCUMENTS

2011/0075760 A1 *  3/2011  Ogawa ................ H04J 13/0055
                                                            375/296
2012/0127948 A1    5/2012  Chung et al.
(Continued)

FOREIGN PATENT DOCUMENTS

WO    WO-2013085274 A1 *  6/2013  ............ H04W 48/08

OTHER PUBLICATIONS

Ericsson et al., "Uplink DMRS Resource Configuration," 3GPP TSG RAN WG1 Meeting #62bis, R1-105688, Xi' An, China, Oct. 11-15, 2010, 10 pages.
(Continued)

*Primary Examiner* — Moo Jeong
(74) *Attorney, Agent, or Firm* — Birch, Stewart, Kolasch & Birch, LLP

(57) ABSTRACT

An embodiment of the present invention relates to a method by which a base station transmits a downlink signal in wireless communication system, the method including the steps of: transmitting a demodulation-reference signal (DMRS) approval; determining a long-term channel property from the DMRS of a first slot of an uplink sub-frame received by responding to the DMRS approval; receiving a first reference signal from a second slot of the sub-frame on the basis of the determined long-term channel property; determining a short-term channel property from the first reference signal; determining a pre-coding matrix from the
(Continued)

long-term channel property and the short-term channel property; and transmitting a downlink signal through the determined pre-coding matrix.

14 Claims, 9 Drawing Sheets

(51) Int. Cl.
*H04L 5/00* (2006.01)
*H04B 7/0413* (2017.01)

(56) References Cited

U.S. PATENT DOCUMENTS

| | | | |
|---|---|---|---|
| 2013/0039235 A1* | 2/2013 | Rahman | H04B 7/0417 370/280 |
| 2013/0083683 A1* | 4/2013 | Hwang | H04W 64/00 370/252 |
| 2013/0322280 A1 | 12/2013 | Pi | |
| 2014/0328422 A1* | 11/2014 | Chen | H04B 7/0486 375/267 |
| 2015/0050930 A1* | 2/2015 | Seo | H04W 76/14 455/434 |
| 2016/0156397 A1* | 6/2016 | Onggosanusi | H04B 7/0456 370/252 |
| 2017/0311321 A1* | 10/2017 | Kakishima | H04W 72/0446 |

OTHER PUBLICATIONS

Huawei et al., "Discussion and evaluation for DMRS overhead reduction," 3GPP TSG RAN WG1 Meeting #72bis, R1-130891, Chicago, USA, Apr. 15-19, 2013, 8 pages.

Mitsubishi Electric, "Uplink DM-RS design," 3GPP TSG RAN WG1 #60 meeting, R1-101458, San Francisco, USA, Feb. 22-26, 2010, pp. 1-8.

Renesas Mobile Europe Ltd, "Performance of downlink MIMO enhancements," 3GPP TSG-RAN WG1 Meeting #72, R1-130416, St Julian's, Malta, Jan. 28-Feb. 1, 2013, 6 pages.

* cited by examiner (a)

(b)

METHOD AND DEVICE FOR TRANSMITTING DOWNLINK SIGNAL IN WIRELESS COMMUNICATION SYSTEM

CROSS REFERENCE TO RELATED APPLICATIONS

This application is the National Phase of PCT International Application No. PCT/KR2015/007458, filed on Jul. 17, 2015, which claims priority under 35 U.S.C. 119(e) to U.S. Provisional Application No. 62/026,011, filed on Jul. 17, 2014, all of which are hereby expressly incorporated by reference into the present application.

TECHNICAL FIELD

The present invention relates to a wireless communication system, and more particularly, to a method of transmitting and receiving an RS configuration for channel estimation in a massive MIMO, a method of transmitting a downlink signal of a base station, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE OF THE INVENTION

Technical Task

A technical task of the present invention is to provide a method of transmitting and receiving an RS configuration for channel estimation in a massive MIMO, a method for a base station to estimate a channel, and a method of transmitting a downlink signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to the first technical aspect of the present invention, a method of transmitting a downlink signal, which is transmitted by an eNB in a wireless communication system, includes the steps of transmitting a DMRS (demodulation-reference signal) grant, determining a long-term channel characteristic based on a DMRS of a first slot of an uplink subframe which is received in response to the DMRS grant, receiving a first reference signal from a second slot of the subframe based on the determined long-term channel characteristic, determining a short-term channel characteristic based on the first reference signal, determining a precoding matrix based on the long-term channel characteristic and the short-term channel characteristic, and transmitting a downlink signal through the determined precoding matrix.

To further achieve these and other advantages and in accordance with the purpose of the present invention, according to the second technical aspect of the present invention, an eNB transmitting a downlink signal in a wireless communication system includes a transmission module and a processor, the processor configured to transmit a DMRS (demodulation-reference signal) grant, the processor configured to determine a long-term channel characteristic based on a DMRS of a first slot of an uplink subframe which is received in response to the DMRS grant, the processor configured to receive a first reference signal from a second slot of the subframe based on the determined long-term channel characteristic, the processor configured to determine a short-term channel characteristic based on the first reference signal, the processor configured to determine a precoding matrix based on the long-term channel characteristic and the short-term channel characteristic, the processor configured to transmit a downlink signal through the determined precoding matrix.

The first and the second technical aspect can include all or a part of items described in the following.

The DMRS grant may indicate a DMRS to be transmitted to the first slot irrespective of whether or not a UE, which have received the DMRS grant, has uplink data to transmit.

The precoding matrix is configured as V=BP, V corresponds to the precoding matrix, B corresponds to a pre-beamforming matrix determined based on the long-term channel characteristic, and P may correspond to a precoding matrix determined based on the short-term channel characteristic.

The first reference signal may correspond to an SRS (sounding reference signal) transmitted in a resource region except the last OFDM symbol of the second slot.

A length of a Zadoff-Chu (ZC) sequence, which is used for generating the DMRS and the first reference signal, can be determined according to a maximum transmission bandwidth.

When the length of the ZC sequence is determined according to the maximum transmission bandwidth, the ZC sequence can be truncated according to an actual bandwidth.

A length of a Zadoff-Chu (ZC) sequence, which is used for generating an SRS transmitted at the last OFDM symbol of the second slot, can be determined according to an actual bandwidth.

Advantageous Effects

According to the present invention, it is able to efficiently receive a reference signal for configuring a massive MIMO.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
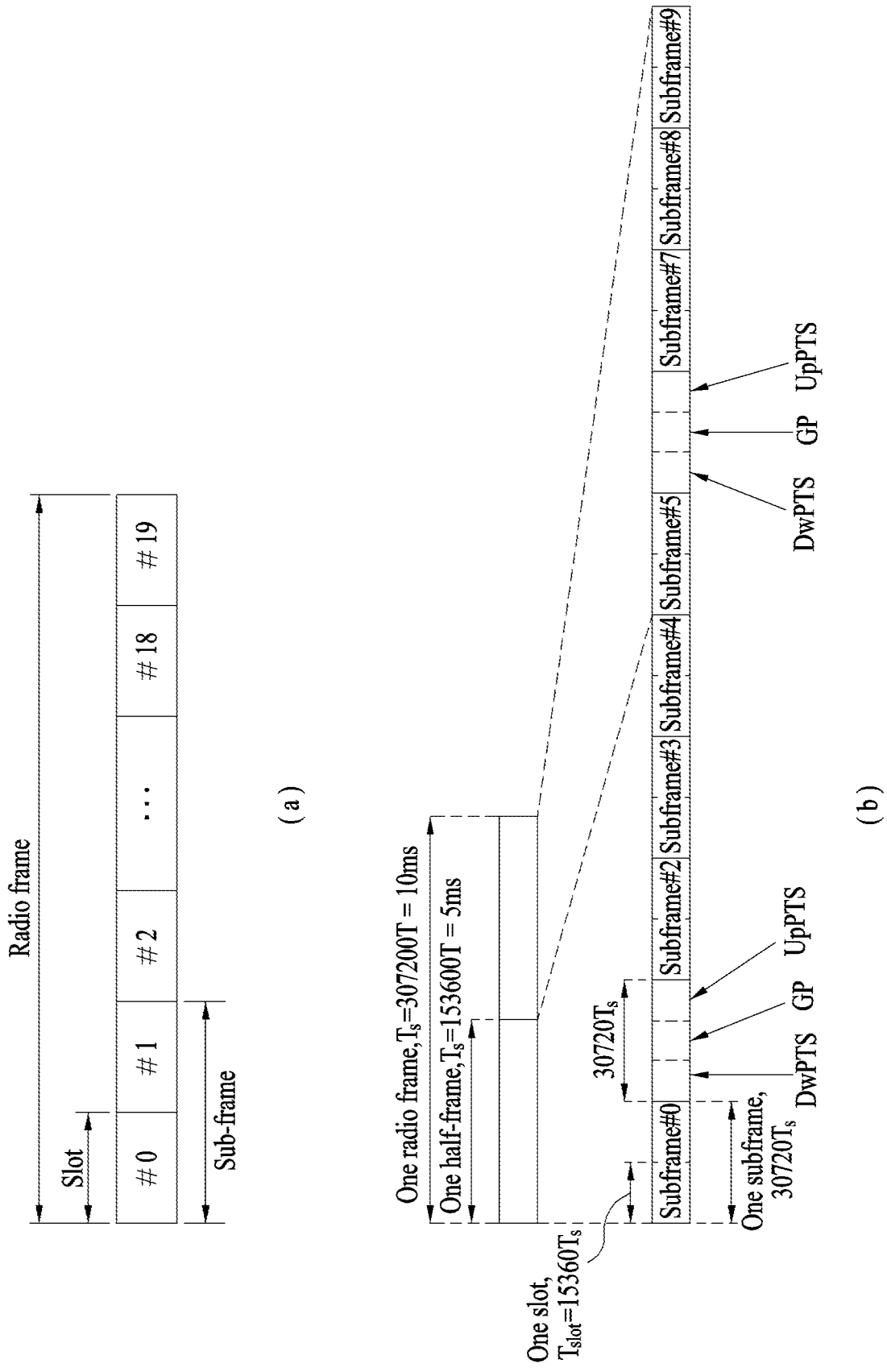
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
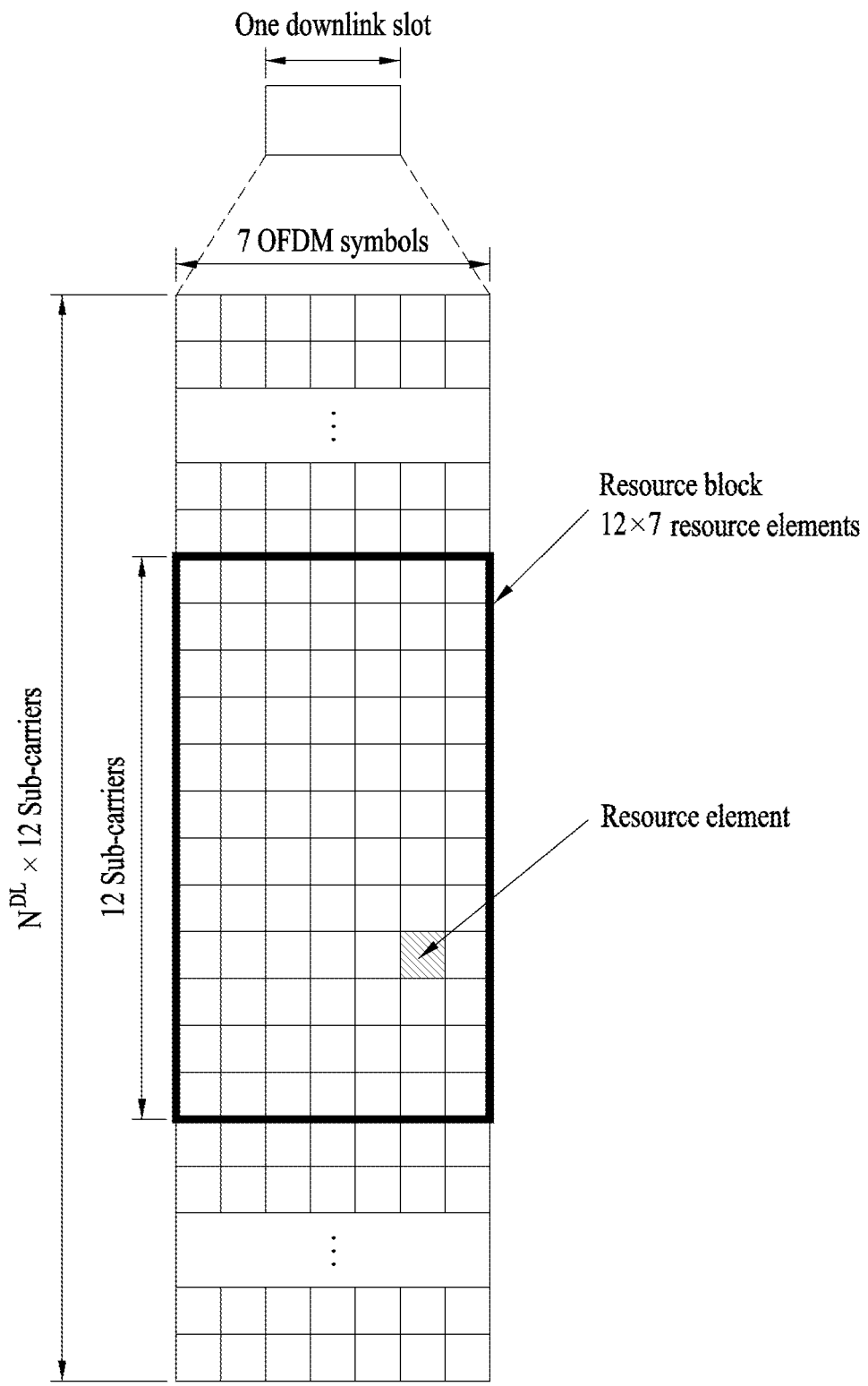
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
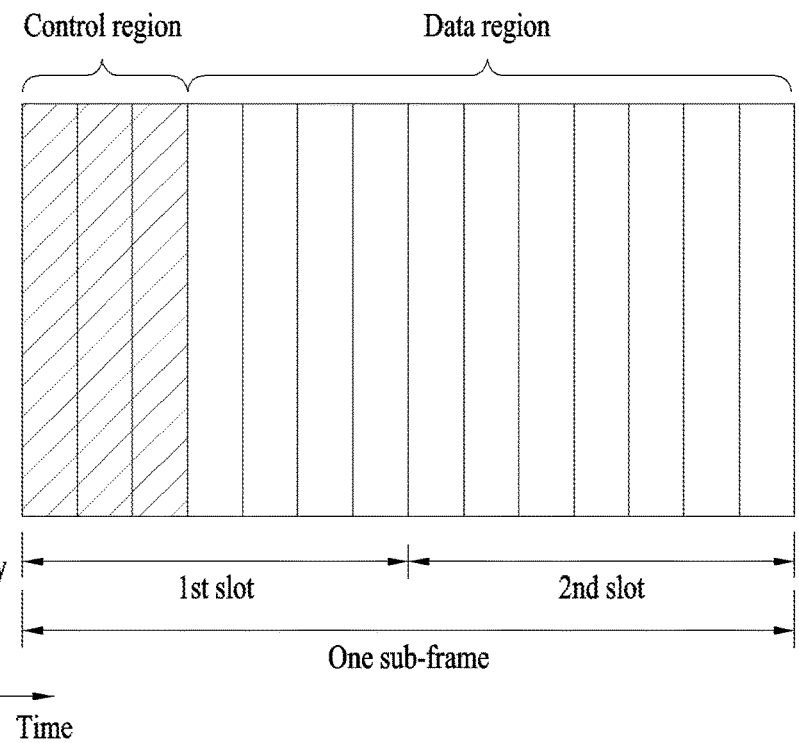
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
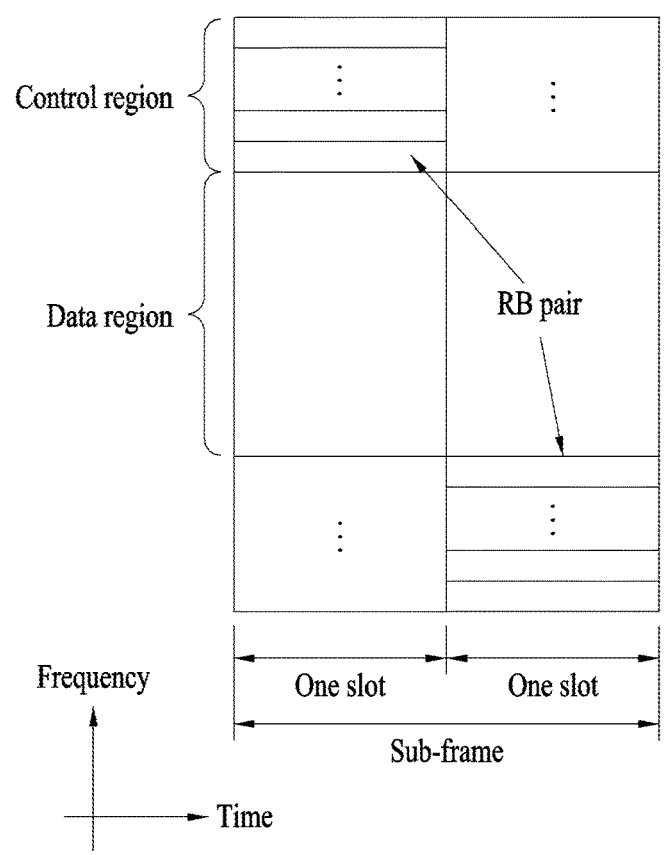
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multi-Antenna (MIMO) System

Figure 5:
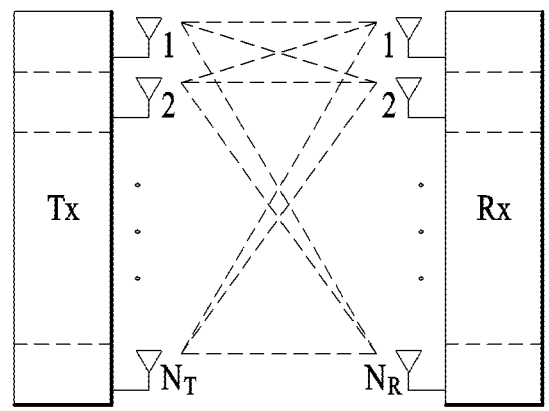
FIG. 5 is a diagram for a configuration of a wireless communication system including multiple antennas.
Figure 5:
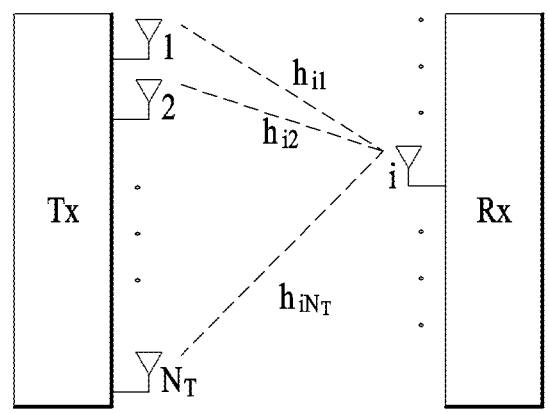
Figure 6:
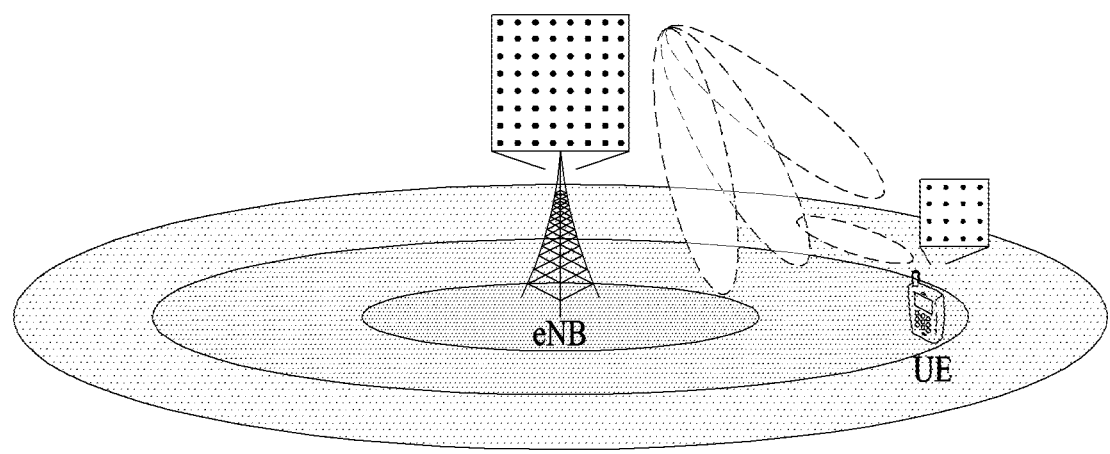
FIGS. 6 to 7 are diagrams for explaining a massive MIMO communication system.

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

An AWGN (Additive White Gaussian Noise) is added to the actual channels after a channel matrix H. The AWGN $n_1$, $n_2$, ... $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$rank(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the present document, 'rank' for MIMO transmission corresponds to the number of paths capable of independently transmitting a signal at a specific timing and a specific frequency resource and 'number of layers' corresponds to the number of signal streams transmitted via each path. In general, since a transmitting end transmits layers as many as the number of ranks used for transmitting a signal, ranks may have a meaning identical to the number of layers unless there is a special citation.

Sounding Reference Signal (SRS)

A UE can transmit an SRS on an SRS resource for uplink channel estimation of an eNB. The SRS can be transmitted by two trigger types including a trigger type 0 indicating an SRS resource by higher layer signaling and a trigger type 1 indicating an SRS resource by a DCI format. If it is necessary to perform the SRS transmission transmitted by the trigger type 0 and the SRS transmission transmitted by the trigger type 1 in an identical subframe, the UE preferentially performs the SRS transmission transmitted by the trigger type 1.

An SRS parameter for the trigger type 0 and the trigger type 1 can be configured to a UE for each serving cell. The SRS parameter can include $\bar{k}_{TC}$, start physical resource block allocation $n_{RRC}$, duration indicating a section, an SRS subframe offset $T_{offset}$, SRS period $T_{SRS}$, srs-ConfigIndex $I_{SRS}$ for $T_{SRS}$, SRS bandwidth $B_{SRS}$, frequency hopping bandwidth $b_{hop}$, cyclic shift $n_{SRS}^{cs}$ antenna port number $N_p$, and the like. For details, it may refer to legacy LTE standard document.

When the SRS is transmitted by the trigger type 1, a DCI format 4 can include SRS request values shown in Table 1 in the following and an SRS parameter set can be determined according to each SRS request value.

TABLE 1

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

When the SRS is transmitted by the trigger type 1, a DCI format 0 uses a single parameter set configured by higher layer signaling. DCI format 1A/2B/2C/2D uses a common SRS parameter configured by higher layer signaling.

In the trigger type 0, in case of TDD or FDD where $T_{SRS} > 2$, an SRS is transmitted in a subframe that satisfies Equation 12 in the following.

$$(10 \cdot n_f + k_{SRS} - T_{offset}) \mod T_{SRS} = 0$$ [Equation 12]

In this case, $T_{offset}$ and $T_{SRS}$ may follow Table 2 in case of FDD and follow Table 3 in case of TDD. $k_{SRS}$ may follow Table 4 in the following.

TABLE 2

| SRS Configuration Index $I_{SRS}$ | SRS Periodicity $T_{SRS}$ (ms) | SRS Subframe Offset $T_{offset}$ |
| --- | --- | --- |
| 0-1 | 2 | $I_{SRS}$ |
| 2-6 | 5 | $I_{SRS} - 2$ |

TABLE 2-continued

| SRS Configuration Index $I_{SRS}$ | SRS Periodicity $T_{SRS}$ (ms) | SRS Subframe Offset $T_{offset}$ |
|---|---|---|
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

TABLE 4

| | subframe index n | | | | | | | | | |
|---|---|---|---|---|---|---|---|---|---|---|
| | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

In case of the trigger type 1, if a UE receives an SRS request in a subframe n, the UE can transmit an SRS in a first subframe that satisfies n+k,k≤4 and Equation 13 in the following.

$$(10 \cdot n_f + k_{SRS} - T_{offset,1}) \bmod T_{SRS,1} = 0, \text{TDD with } T_{SRS,1} > 2 \text{ and FDD } (k_{SRS} - T_{offset,1}) \bmod 5 = 0, \text{TDD with } T_{SRS,1} = 2 \quad [\text{Equation 13}]$$

In Equation 13, each parameter may follow Table 5 in case of FDD and follow Table 6 in case of TDD.

TABLE 5

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 6

| SRS Configuration Index $I_{SRS}$ | SRS Periodicity $T_{SRS, 1}$ (ms) | SRS Subframe Offset $T_{offset, 1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Evolved Antenna System

A wireless communication system appearing after LTE Rel-12 considers introducing an active antenna system (hereinafter, AAS). Unlike an active circuit capable of adjusting a phase and a size of a signal and a legacy passive antenna system that antennas are separated from each other, the AAS corresponds to a system that each antenna is configured as an active antenna including an active circuit. Since the AAS uses an active antenna, it is not necessary for the AAS to have a separate cable for connecting an active circuit with an antenna, a connector, other hardware, and the like. Hence, the AAS has characteristics that efficiency is high in terms of energy and management cost. In particular, since the AAS supports an electronic beam control scheme according to each antenna, the AAS enables an evolved MIMO technique such as forming a delicate beam pattern in consideration of a beam direction and a beam width, forming a 3D beam pattern, and the like.

As the evolved antenna system such as the AAS and the like is introduced, a massive MIMO structure including a plurality of input/output antennas and multi-dimensional antenna structure is also considered. As an example, in case of forming a 2D antenna array instead of a legacy straight antenna array, it may be able to form a 3D beam pattern according to the active antenna of the AAS. In the aspect of an eNB, if the 3D beam pattern is utilized, the eNB may consider forming a sector not only in horizontal direction but also in a vertical direction of a beam. Moreover, in the aspect of a UE, when a reception beam is formed by utilizing a massive reception antenna, the UE may expect a signal power increasing effect according to an antenna array gain. Hence, it may have an advantage that performance requirement of a system is satisfied by transmit power lower than legacy transmit power.

In order to obtain a theoretically achievable gain in the massive MIMO structure, it is necessary for an eNB to precisely know channel information between the eNB and a UE. To this end, channel information estimation and feedback are much more required in the massive MIMO structure than a legacy small-scale MIMO structure. In particular, since a FDD system is unable to use channel reciprocity, not only huge amount of pilots in DL but also PMI feedback of very high resolution in UL are required in the FDD system. Hence, it is necessary for the eNB to have a method capable of reducing DL pilot overhead, reducing UL channel information feedback amount, and precisely obtaining channel information in the massive MIMO system. And, since it is necessary for a plurality of UEs to estimate an uplink channel without interference in a TDD system capable of using the channel reciprocity, it is necessary to increase uplink RS capacity.

A system model capable of being applied to the embodiment of the present invention is explained in the following. First of all, assume that an eNB has M number of transmission antennas and a UE has a single reception antenna for clarity. Yet, the principle of the present invention is not restricted by the UE having a single reception antenna only. A signal received in the UE can be represented as equation 14 in the following.

$$y = h^H V s + n \quad \text{[Equation 14]}$$

In this case, h corresponds to M×1 channel vector, V corresponds to M×d downlink precoding matrix, s corresponds to d×1 downlink transmission symbol vector, and n corresponds to AWGN signal. In this case, a precoding matrix can be represented as a dual precoding structure as shown in equation 15 in the following.

$$V = BP \quad \text{[Equation 15]}$$

Figure 7:
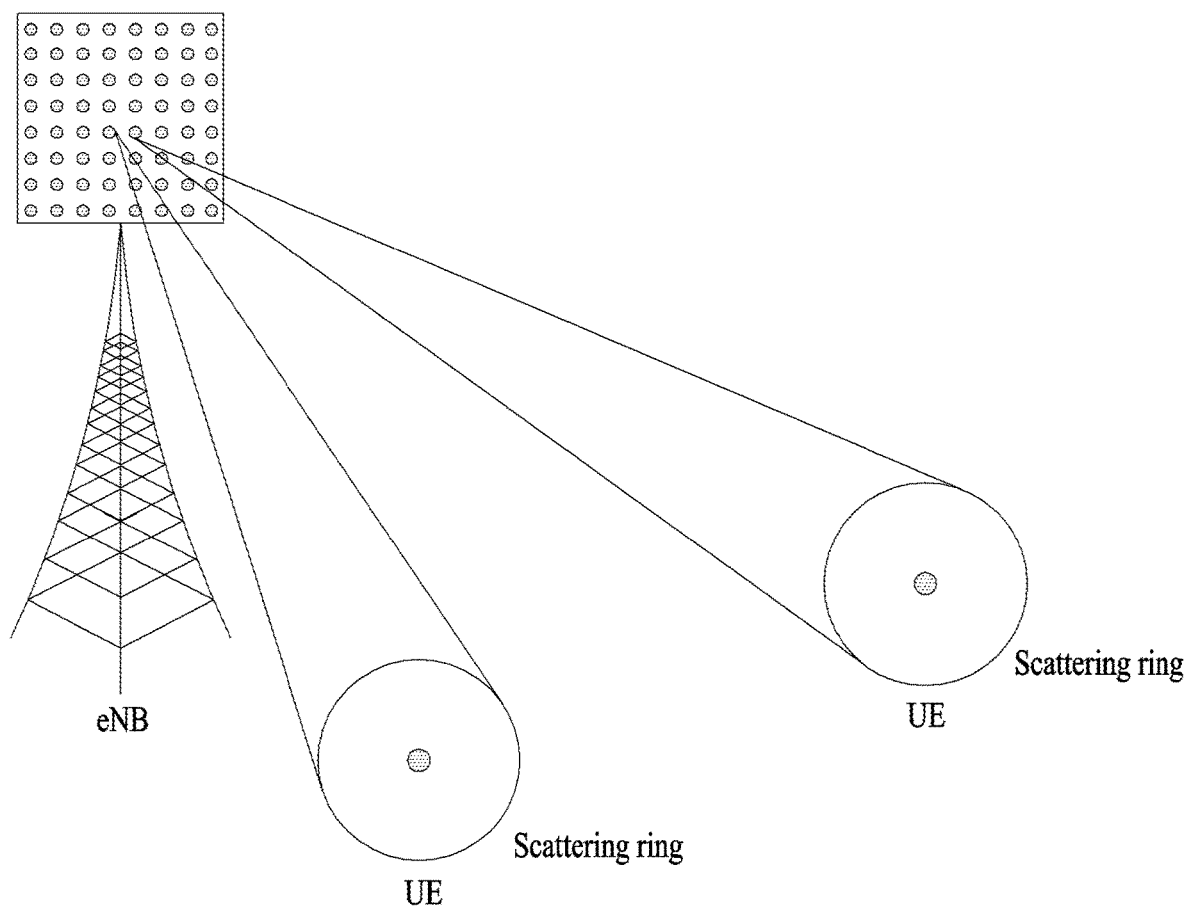

In this case, B corresponds to M×b pre-beamforming matrix and P corresponds to b×d precoding matrix. In this case, B matrix can be determined by long term statistics of a channel. When UEs are appropriately grouped, the UEs can be grouped to make a channel to be decoupled in long term sense. In terms of implementation, the B matrix can be implemented by a digital circuit of baseband, whereas the B matrix to which long term characteristic of a channel is reflected can be implemented by an analog circuit. When UEs are physically located at a similar location, AoD (in this case, the AoD indicates an angle of departure from an eNB to a UE) of a channel becomes similar. When UEs are physically away from each other, the AoD becomes different. Hence, it may be able to configure B matrix orthogonal to each other. For example, as shown in FIG. 7, it may be able to configure pre-beamforming matrixes orthogonal to each other as locations of UEs are getting far from each other. As shown in the example, if an eNB is able to configure a pre-beamforming matrix according to a UE or a UE group, it is not necessary for the eNB to transmit (show) RS for the entire antennas. Instead, the eNB may transmit a precoded RS to which the pre-beamforming matrix is applied and a UE may perform channel estimation and feedback only on the precoded RS. In particular, since the channel estimation and the feedback of the UE are performed on a reduced dimension of the pre-beamforming matrix only, a burden for the channel estimation and the feedback is considerably reduced in the massive MIMO system.

Since it is able to anticipate that long terms statistics of a channel such as AoD and AS (angular spread) is similar in a UL band and a DL band in FDD system, the present invention proposes that an eNB performs the long term statistics of a channel using a UL band in the massive MIMO system. In particular, if a UE transmits an uplink RS to an eNB, the eNB estimates long term statistics of a channel. In this case, if the number of antennas of the eNB increases like the massive MIMO system, it is necessary to increase the number of samples for estimating the long term statistics of a channel as well to secure a certain level of accuracy of the long terms statistics. As an example, when an eNB has N number of antennas, in order for the eNB to estimate a non-singular covariance matrix for the N number of variables, the minimum N number of samples is required. This is because, if the number of samples is less than N, a sample covariance matrix becomes singular. And, if a covariance is estimated by the N number of samples only, estimation accuracy of a covariance matrix becomes very inaccurate. Hence, many numbers of samples are actually required. As an example, a MIMO system having 64 antennas may additionally needs samples as many as 8 times compared to a MIMO system having 8 antennas to precisely estimate a covariance matrix.

A case of transmitting a UL RS in a legacy LTE system can be classified into a case of receiving a UL grant when a specific UE has a packet to be transmitted in UL, a case of transmitting PUCCH as A/N in response to a DL packet, and a case of receiving an indication from an eNB to transmit an SRS. The UL grant can be received only when there is a data packet to be transmitted in UL. The PUCCH is transmitted as the A/N for a DL packet only when the DL packet is received. If there is no UL/DL packet, an SRS is transmitted in the last symbol of an SF. Yet, since a legacy SRS is always transmitted in the last symbol of an SF, in order to estimate long term channel statistics in the massive MIMO system, it is necessary to transmit SRS for scores or hundreds of SFs. As a result, excessive delay occurs. This type of characteristics also occurs in a TDD system that estimates a DL channel using channel reciprocity. In the TDD system, an eNB is able to estimate long term statistics of a channel only when many UL RSs are transmitted.

Hence, a method of efficiently estimating long term statistics of a channel in a massive MIMO system and methods of transmitting a downlink signal based on the estimation method are explained in the following.

Configuration of Uplink RS

First embodiment relates to a method of configuring an uplink RS. As mentioned in the foregoing description, it is difficult to properly estimate long term statistics using an uplink RS of a legacy LTE system in a massive MIMO system. To this end, it may be able to configure uplink RS subframe/slot. In the following, for clarity, an RS subframe is mainly explained. Yet, a subframe may correspond to a different time unit, e.g., a slot.

It may be able to configure an RS to be transmitted in an uplink subframe or all symbols of a PUSCH region (of a prescribed frequency domain) of a subframe. Scheduling can be restricted in the uplink subframe.

As mentioned in the foregoing description, a time/frequency location of a resource pool in which an RS is transmitted may be cell-specific and periodical (or aperiodical). In particular, a prescribed RB can be periodically configured as an RS transmission region in a PUSCH region or a specific PUSCH resource region can be configured as an RS transmission region by a direct indication of an eNB.

Figure 8:
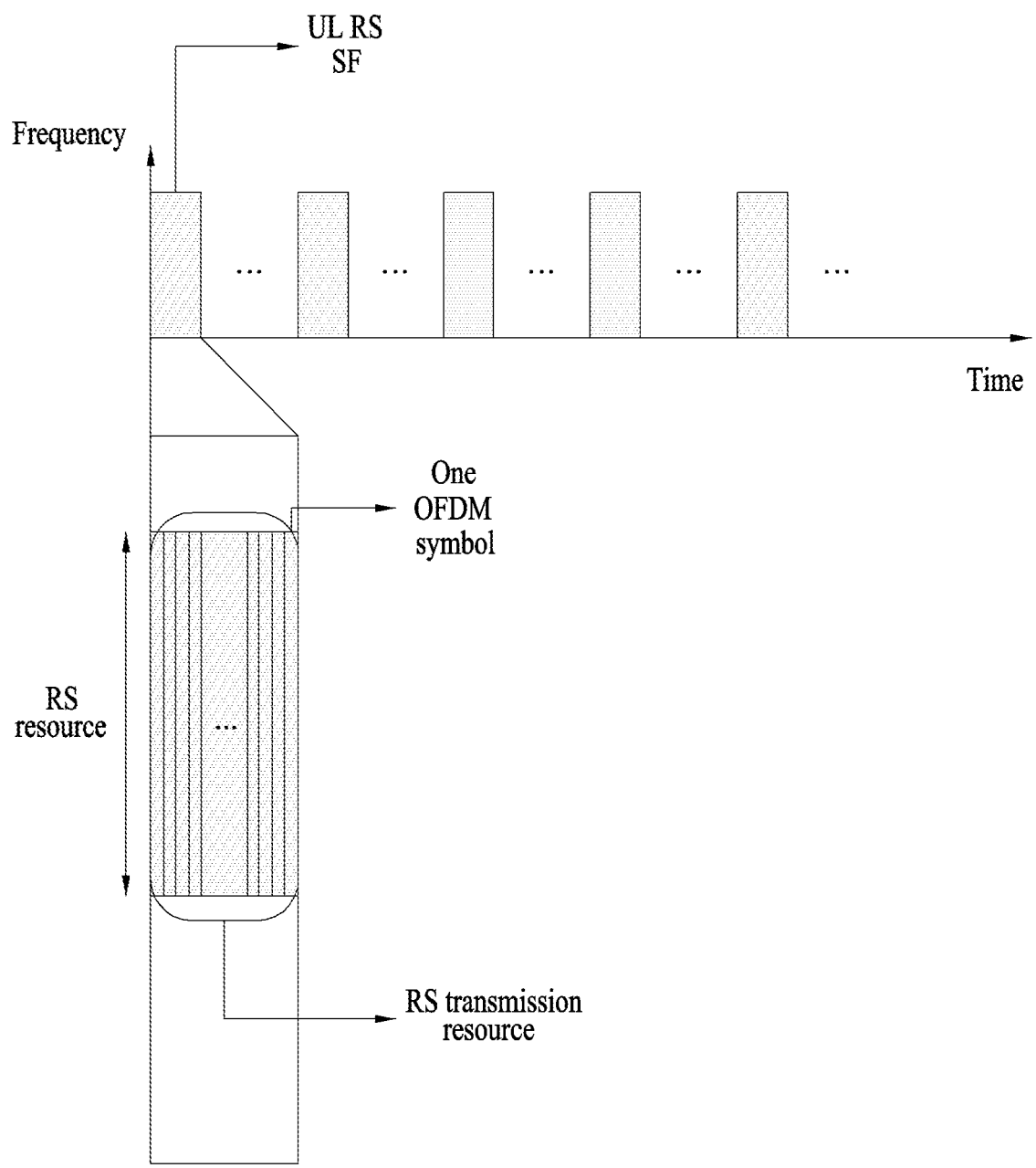
FIGS. 8 to 9 are diagrams for explaining an RS configuration according to embodiments of the present invention.

As shown in FIG. 8, if a resource pool is periodical, all or a part of a period of a transmission resource, SF offset, RS sequence, repetition factor, time (symbol index or offset) and/or frequency resource position (e.g., RB index or offset, SRS bandwidth), and cyclic shift (CS) can be individually signaled to each UE via physical layer signaling and the remaining part can be signaled via higher layer signaling.

Meanwhile, in order to reduce signaling overhead, a time position of a resource pool in which an RS is transmitted, i.e., an OFDM symbol position, or a part of the aforementioned parameters can be configured depending on a UE ID. For example, a number generated by performing modular calculation on RNTI with the number of OFDM symbols in an SF can be designated as a position to which UL RS is transmitted.

A frequency resource position of a resource pool in which an RS is transmitted may use all frequency resource positions configured in each cell or a specific part selected from among the frequency resource positions. In case of using the specific part of the frequency resource positions only, a time/frequency resource position used by each UE can be signaled in advance via physical layer signaling or higher layer signaling. Or, in order to reduce signaling overhead, a time/frequency resource position used by each UE to transmit an RS can be configured depending on a UE ID. For example, an RS can be transmitted at a time/frequency domain position corresponding to a value resulted from dividing a UL RS transmission resource pool by N number of time/frequency domains and performing modular calculation on the N number of frequency domains with a UE ID of N. Or, a time/frequency resource position at which an RS is transmitted by each UE can be signaled via physical layer signaling or higher layer signaling.

If a resource pool is aperiodical, an eNB can indicate a specific UE or UE group to transmit a UL RS via physical layer signaling or higher layer signaling. All or a part of a transmission period, transmission count, SF offset, RS sequence, repetition factor, time (symbol index or offset) and/or frequency resource position (e.g., RB index or offset, SRS bandwidth), and cyclic shift (CS) can be individually signaled to each UE via physical layer signaling or higher layer signaling. In this case, one part of the remaining part can be signaled via higher layer signaling and another part of the remaining part can be signaled together with a transmission indication signal of the eNB.

An RS transmitted in the subframe may correspond to an SRS, a DMRS, or the like. If the RS correspond to the SRS, it may depend on an SRS configuration and a signaling method defined in the legacy LTE. An SRS transmission triggering signal can be configured via higher layer signaling or physical layer signaling and the triggering signal may correspond to a cell-specific or UE (group)-specific signal. In this case, a symbol position of an SRS transmitted by a UE can be configured in advance by higher layer signaling and the aforementioned SRS parameters can also be signaled via higher layer signaling. Or, the symbol position in which the SRS is transmitted and the transmission triggering can also be signaled via physical layer signaling. In this case, a single UE may transmit a plurality of RSs in a UL RS SF and the number of RSs capable of being transmitted in a UL RS SF can be configured by a network.

In case of using a DMRS as an RS, a frequency resource position, a transmission symbol position, and a DMRS CS transmitted by each UE can be signaled in advance via higher layer signaling or physical layer signaling. A transmission triggering signal can also be signaled via physical layer signaling or higher layer signaling.

Meanwhile, it may be able to use an RS of a new format not defined as a UL RS in legacy LTE. The new RS different from a legacy UL RS may have at least a different thing selected from the group consisting of a repetition factor (increase of the available transmission comb), a transmission symbol position, the number of CS (increase/decrease of the number of CS), an RS bandwidth (support wide bandwidth only or restrict some bandwidth), and an RS sequence (not naïve ZC sequence, e.g. truncated ZC sequences). For example, a legacy SRS supports a repetition factor up to 2. On the contrary, an SRS transmitted in a UL RS SF can be transmitted in a manner of being supported by a bigger repetition factor. For example, it may support a repetition factor 4, 6 or 8. And, it may be able to use a CS set of less number of CSs such as 4 or 6 instead of 8 used by a legacy SRS. Or, it may be able to use a CS set of the increased number of CSs such as 10 or 12. The number of CS sets is reduced to reduce the number of CSs for enhanced reception capability in a symbol area because RS transmission capability is increased in time domain. If the number of CS sets increases, overall RS transmission capability increases.

Meanwhile, in order to estimate AoD/AS or long term statistics as soon as possible with minimum RS transmission, it may use a mode for performing transmission in a frequency domain as wide as possible only when a UL RS is transmitted. As an example, it may use a configuration for performing transmission in a widest frequency domain among system bandwidth given by SRS configuration. Or, it may not use SRS configuration using a partial narrow band only among a legacy SRS configuration. The above-mentioned scheme is able to quickly estimate long term statistics and exclude a partial configuration from signaling, it may be able to reduce signaling overhead. Or, it may be able to determine a rule that SRS configuration of a narrow band is used all the time to reduce RS collision between UEs in a resource region in which an RS is transmitted only.

And, a DMRS or an SRS may correspond to a truncated ZC sequence (Zadoff-Chu sequence). More specifically, when an SRS or a DMRS is generated, a ZC sequence length is determined on the basis of a maximum transmission bandwidth or a predetermined bandwidth instead of an actual bandwidth and it may truncate the ZC sequence length in accordance with the actual bandwidth (or the predetermined bandwidth). In this case, CS can be applied to a ZC sequence of maximum transmission bandwidth length. In case of using the truncated ZC sequence, it may be able to generate more ZC sequences. For example, if maximum BW corresponds to 40 RBs and actual BW corresponds to 10 RBs, it may be able to generate RS sequences as many as 4 times compared to RS sequences generated by a legacy scheme. In this case, although CS is differently configured in the actual bandwidth, a truncated ZC sequence is not completely orthogonal. However, since it is able to generate more combinations compared to the legacy ZC sequence, it may be able to reduce probability of using the same ZC sequence with a neighboring cell. And, since an eNB is aware of an RS sequence transmitted by a UE in a serving cell, although an RS of the serving cell is quasi orthogonal, it may be able to enhance RS reception performance via a successive interference cancellation (SIC) receiver. Although RS of an intra cell is quasi orthogonal, performance degradation due to correlation between sequences can be minimized by allocating ZC of less correlation to a UE or differently allocating a comb type. In particular, although RS is orthogonal in the intra cell, it may be able to solve performance degradation problem, which occurs due to non-orthogonal, by appropriately performing SIC receiver or RS scheduling. It may be able to achieve enhanced performance by reducing sequence collision probability with other cell. And, it may be able to increase RS capacity by enabling RS of more combinations to be transmitted.

Figure 9:
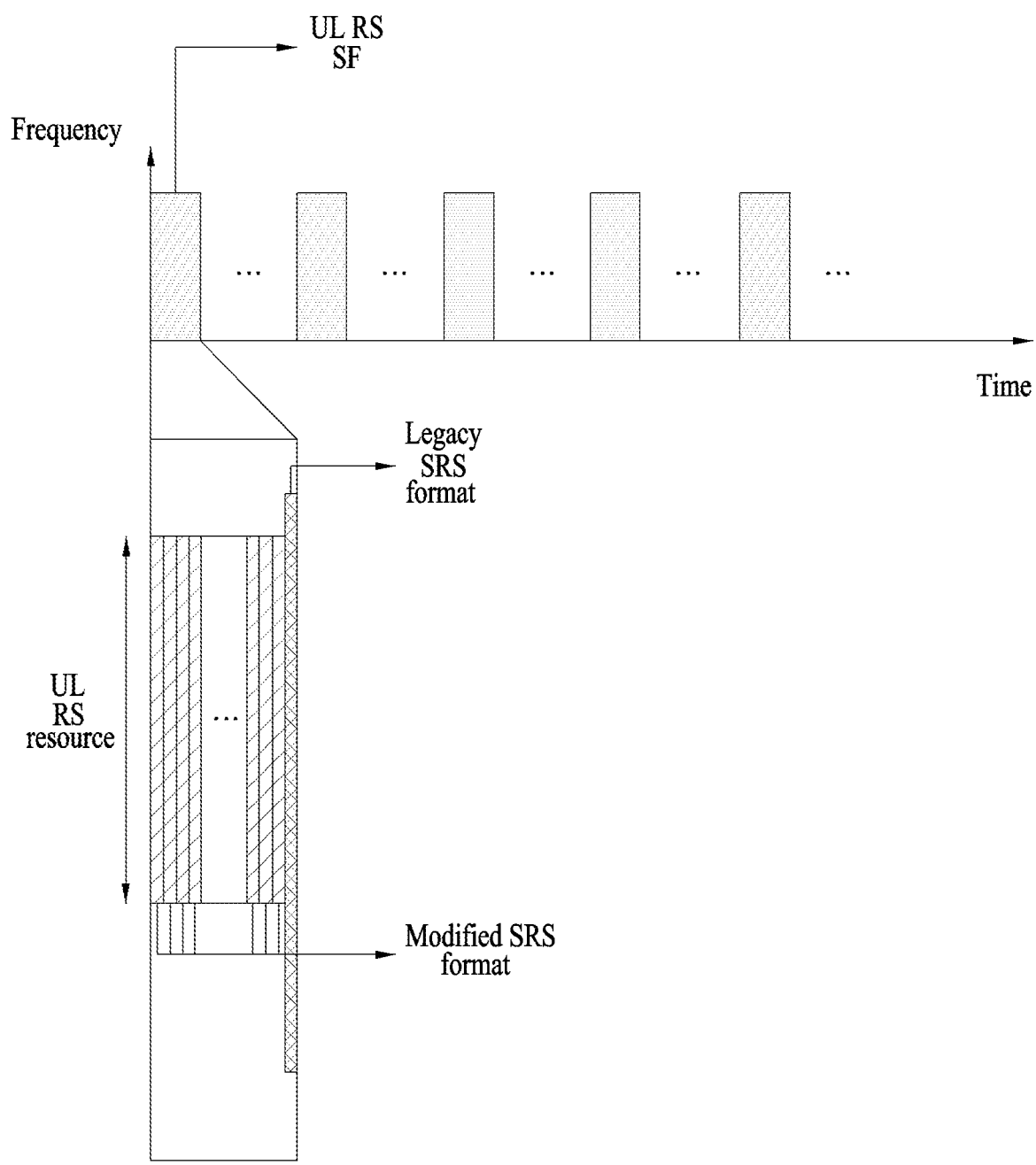

In case of using a truncated RS or a new format, a resource region to which an RS is transmitted may correspond to the aforementioned region or a region except a region in which a legacy RS is transmitted. For example, in case of using an SRS, as shown in FIG. 9, a region to which a truncated SRS is transmitted may correspond to the remaining region except an OFDM symbol to which a legacy DMRS or an SRS is transmitted. The legacy format is reused as it is in the symbol in which the legacy RS is transmitted for backward compatibility with the legacy UEs.

Meanwhile, it may be able to configure a UE to transmit an RS via an uplink packet and an independent RS grant. An eNB receives the RS and may be then able to estimate long term statistics of a channel. The RS grant can use a DCI format of a new format or a DCI format defined by legacy LTE. In case of using a DCI format for uplink grant defined by the legacy LTE, an RA field and an RS CS field can be reused for the usage of configuring a frequency domain in which an RS is transmitted and an RS CS and the rest of fields can be used for a different usage. In this case, the RS CS is configured not to be collided with a UE receiving legacy PUSCH scheduling. Or, the RS CS and the RA can be signaled in advance via higher layer signaling. And, a period of transmitting an RS and an SF location can also be signaled to a UE via higher layer signaling. When a new DCI format is defined, if a length of the new DCI format is defined by one of the legacy DCI formats, it is able to prevent the count of performing blind decoding from being increased. For example, it may reuse a DCI format 3/3A to indicate UEs of a specific group to transmit an RS at the same time.

Channel Estimation and Signal Transmission of eNB, which have Received UL RS

In the following, an operation of an eNB, which have received the aforementioned UL RS, is explained.

An eNB can transmit an RS grant to UEs. As mentioned in the foregoing description, the RS grant indicates a UE to transmit an RS irrespective of whether or not a UE, which have received the RS grant, has UL data to transmit. Having received the RS grant, UEs can transmit a DMRS and a first reference signal (e.g., an SRS) to a first slot and a second slot of a UL SF, respectively. Yet, this is just an example only. A UE may transmit a DMRS only in a subframe. In this case, the UE can transmit an SRS in a subframe for a next UL RS.

Subsequently, the eNB can determine a long-term channel characteristic through the DMRS of the first slot. The eNB receives an SRS from the second slot of the subframe based on the channel characteristic and can determine a short-term channel characteristic based on the SRS. The eNB determines a precoding matrix based on the long-term channel characteristic and the short-term channel characteristic and may be then able to transmit a downlink signal via the determined precoding matrix. In this case, the precoding matrix can be configured as V=BP. In this case, V corresponds to the precoding matrix, B corresponds to a pre-beamforming matrix which is determined based on the long-term channel characteristic, and P corresponds to a precoding matrix which is determined based on the short-term channel characteristic.

The DMRS and/or the SRS can be determined based on the aforementioned truncated ZC sequence. In particular, a length of a ZC sequence, which is used for generating the RSs, can be determined according to a maximum transmission bandwidth (or a predetermined bandwidth). As mentioned in the foregoing description, after the length of the ZC sequence is determined according to the maximum transmission bandwidth, the ZC sequence can be truncated according to an actual bandwidth. The SRS can be transmitted on a symbol rather than the last symbol of a subframe to guarantee operations of legacy UEs. In particular, a length of a ZC sequence for generating an SRS transmitted on a symbol rather than the last symbol of a subframe is determined according to the maximum transmission bandwidth and a length of a ZC sequence for generating an SRS transmitted on the last symbol is determined according to an actual bandwidth.

The aforementioned methods can be used not only for estimating long term statistics in FDD but also for reducing pilot contamination by increasing UL RS capacity in a scheme of using channel reciprocity in TDD system.

Meanwhile, in order to reduce pilot contamination between neighboring cells, time domain or frequency domain ICIC can be introduced to a region in which an RS of a neighboring cell is transmitted. For example, a cell A transmits an RS in such a time frequency resource as A and a cell B can transmit an RS in such a time frequency resource as B (in this case, the resource A and the resource B are orthogonal to each other). In this case, ICIC can be performed in a unit of SF, a unit of symbol, a unit of RB, or even a unit of slot. In order to perform the aforementioned operation, information on an RS resource region to be used by a cell of an eNB can be shared between eNBs via backhaul (e.g., X2 interface).

Configurations of Devices for Embodiments of the Present Invention

Figure 10:
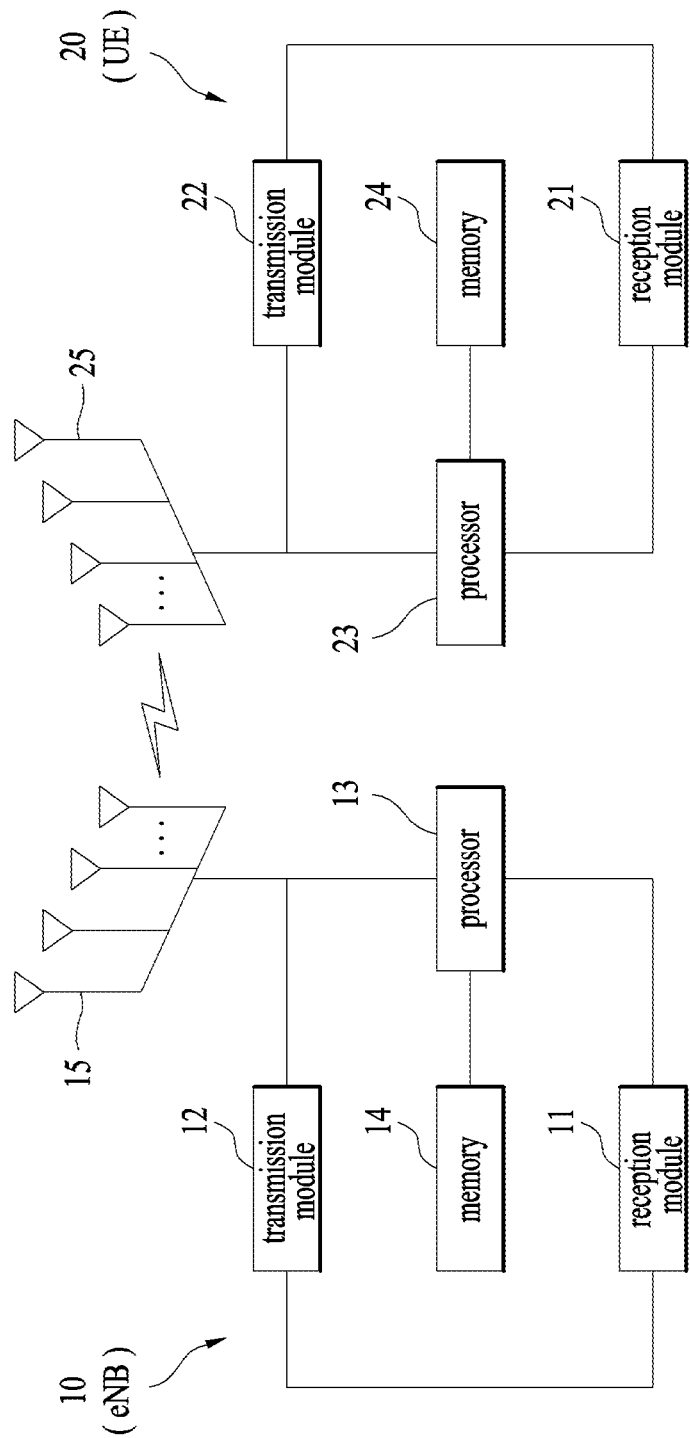
FIG. 10 is a diagram for a configuration of a transceiver.

FIG. 10 is a diagram illustrating configuration of a transmit point apparatus and a UE according to one embodiment of the present invention.

Referring to FIG. 10, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 10, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 10 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a downlink signal, which is transmitted by an evolved Node B (eNB) in a wireless communication system, the method comprising:
   transmitting reference signal (RS) configuration information and information for requesting a transmission of a RS to a user equipment (UE);
   determining a long-term channel characteristic based on the RS transmitted from the UE, wherein the RS is configured based on the RS configuration information and the information for requesting the transmission of the RS;
   determining a precoding matrix based on the long-term channel characteristic; and
   transmitting a downlink signal through the determined precoding matrix,
   wherein the RS configuration information includes information indicating a transmission resource for the transmission of the RS configured depending on an identifier (ID) of the UE, and
   wherein a time position of the transmission resource is determined by performing a modular calculation on the ID of the UE with a number of Orthogonal Frequency Division Multiple (OFDM) symbols in a subframe for the transmission of the RS.

2. The method of claim 1, wherein the information for requesting the transmission of the RS indicates the RS to be transmitted irrespective of whether or not the UE, which has received the information for requesting the transmission of the RS, has uplink data to transmit.

3. The method of claim 1, wherein the precoding matrix is configured as V=BP, where V corresponds to the precoding matrix, B corresponds to a pre-beamforming matrix determined based on the long-term channel characteristic, and P corresponds to a precoding matrix determined based on a short-term channel characteristic.

4. The method of claim 1, wherein the RS corresponds to a sounding reference signal (SRS).

5. The method of claim 4, wherein a length of a Zadoff-Chu (ZC) sequence, which is used for generating the RS, is determined according to a maximum transmission bandwidth.

6. The method of claim 5, wherein when the length of the ZC sequence is determined according to the maximum transmission bandwidth, the ZC sequence is truncated according to an actual bandwidth.

7. The method of claim 5, wherein a length of a Zadoff-Chu (ZC) sequence, which is used for generating an SRS, is determined according to an actual bandwidth.

8. An evolved Node B (eNB) for transmitting a downlink signal in a wireless communication system, the eNB comprising:
   a transmitter; and
   a processor,
   wherein the processor is configured to:
   control the transmitter to transmit reference signal (RS) configuration information and information for requesting a transmission of a RS to a user equipment (UE);
   determine a long-term channel characteristic based on the RS transmitted from the UE, wherein the RS is configured based on the RS configuration information and the information for requesting the transmission of the RS;
   determine a precoding matrix based on the long-term channel characteristic; and
   control the transmitter to transmit a downlink signal through the determined precoding matrix, wherein the RS configuration information includes information indicating a transmission resource for the transmission of the RS configured depending on an identifier (ID) of the UE, and wherein a time position of the transmission resource is determined by performing a modular calculation on the ID of the UE with a number of Orthogonal Frequency Division Multiple (OFDM) symbols in a subframe for the transmission of the RS.

9. The eNB of claim 8, wherein the information for requesting the transmission of the RS indicates the RS to be transmitted irrespective of whether or not the UE, which has received the information for requesting the transmission of the RS, has uplink data to transmit.

10. The eNB of claim 8, wherein the precoding matrix is configured as V=BP, where V corresponds to the precoding matrix, B corresponds to a pre-beamforming matrix determined based on the long-term channel characteristic, and P corresponds to a precoding matrix determined based on a short-term channel characteristic.

11. The eNB of claim 8, wherein the RS corresponds to a sounding reference signal (SRS).

12. The eNB of claim 11, wherein a length of a Zadoff-Chu (ZC) sequence, which is used for generating the RS, is determined according to a maximum transmission bandwidth.

13. The eNB of claim 12, wherein when the length of the ZC sequence is determined according to the maximum transmission bandwidth, the ZC sequence is truncated according to an actual bandwidth.

14. The eNB of claim 12, wherein a length of a Zadoff-Chu (ZC) sequence, which is used for generating an SRS, is determined according to an actual bandwidth.

* * * * *